United States Patent [19]

Molla

[11] 4,374,706
[45] Feb. 22, 1983

[54] PROCESS FOR THE PURIFICATION OF PHOSPHORUS PENTASULPHIDE BY DISTILLATION UNDER VACUUM

[75] Inventor: Pietro Molla, Milan, Italy

[73] Assignee: Saffa S.p.A., Milan, Italy

[21] Appl. No.: 238,159

[22] Filed: Mar. 2, 1981

Related U.S. Application Data

[63] Continuation-in-part of Ser. No. 902,743, May 3, 1978, abandoned.

[30] Foreign Application Priority Data

May 20, 1977 [IT] Italy ............................ 23796 A/77

[51] Int. Cl.³ .............................................. B01D 3/10
[52] U.S. Cl. ...................................... 203/91; 423/303
[58] Field of Search ...................... 423/561, 562, 303; 203/91

[56] References Cited

U.S. PATENT DOCUMENTS 3,183,062  5/1965  Taylor .............................. 423/303
3,205,041  9/1965  Cremer et al. ................. 423/561 R
3,524,725  8/1970  Cremer et al. ..................... 423/303
3,800,028  3/1974  Robota et al. ...................... 423/303

Primary Examiner—Norman Yudkoff

[57] ABSTRACT

Process for the purification of phosphorus pentasulphide by means of distillation under vacuum at a residual pressure of about 6 mmHg and carried out according to a "thermal profile" comprising, immediately before and immediately after the liquid-vapor-liquid double passage of state, two stationary stages wherein said pentasulphide is maintained in the liquid state at a temperature very close to the boiling temperature of the pentasulphide itself.

3 Claims, 7 Drawing Figures

PROCESS FOR THE PURIFICATION OF PHOSPHORUS PENTASULPHIDE BY DISTILLATION UNDER VACUUM

DESCRIPTION

This patent application is a continuation-in-part application of the patent application Ser. No. 902,743, filed on May 3, 1978 (Priority date May 20, 1977), now abandoned.

The present invention concerns a process for the purification of phosphorus pentasulphide ($P_4S_{10}$) essentially based on its distillation under vacuum, and conducted under particularly suited conditions, as far as the level of residual pressure and type of "thermal profile" are concerned, in order to obtain a high purity degree of said pentasulphide as well as in order to conduct and achieve the industrial distillation of said pentasulphide in a technically and economically convenient way.

It is known that raw phosphorus pentasulphide, obtained by direct synthesis from sulphur and yellow phosphorus, contains all the impurities contained in said starting products (Taylor—U.S. Pat. No. 3,183,062, column 1, lines 40–44), particularly the organic impurities of phosphorus, which can reach even 1% (Cremer, U.S. Pat. No. 3,205,041—col. 1, line 72).

Raw phosphorus pentasulphide may be purified by distillation, but in such an operation—normally conducted at atmospheric pressure—and at a temperature comprised between 515° C. and 520° C.—there occurs the formation of many undesired byproducts, amongst which polysulphides different from $P_4S_{10}$; therefore there arise some serious drawbacks, both of economical nature with a view to the low yields as well as of a technical character as it would be very difficult if not altogether impossible to obtain a phosphorus pentasulphide with a high degree of purity, while there also are corrosion phenomena on the process equipment involving a damage of the same and the pollution by iron of the product under distillation.

Cremer ('041) says that raw phosphorus pentasulphide may be freed from the impurities by distilling it under vacuum.

On the other hand, the indication of Cremer is absolutely on the vague and lacks any useful teaching in the way of how it may be usefully employed industrially even by an expert of the Art.

As a matter of fact, Cremer himself (in U.S. Pat. No. 3,524,725, col. 1, lines 56–64) quite clearly states that the distillation under vacuum of phosphorus pentasulphide is a very difficult operation to be conducted.

In said distillation, in fact, it is particularly difficult to maintain the residual pressure constant in the various apparatuses and in the process stages and to have controlled and regular passages of state, thus avoiding phenomena of entrainment of liquids with the relative impurities, of cloggings and corresponding stoppages of the equipment (Cremer '725, column 1, lines 69–72), wherefore, in practice, not only it is extremely difficult or even impossible to obtain industrially a high-purity phosphorus pentasulphide—for instance with a purity degree greater than 99,98%—but it is also very difficult to realize a process that would be technically and economically convenient.

Robota (U.S. Pat. No. 3,800,028) describes an evaporation process under vacuum (reduced pressure comprised between 200 and 300 mmHg) of phosphorus pentasulphide in order to produce vapours to be then admixed to a hot inert gas and to then obtain, by cooling said mixture, a phosphorus pentasulphide powder of a high reactivity.

The process and the objects of the Robota patent are, on the other hand, substantially different from those of this invention as hereunder even better specified.

Thus, object of this invention is that of providing a purification process by distillation of phosphorus pentasulphide which shall not show the above specified drawbacks, and, more particularly, shall yield a very pure $P_4S_{10}$ end product, and shall have high material yields.

Another object of the invention is that of providing the above said process with excellent industrial operational characteristics, particularly in respect to the substantial absence of technical drawbacks in the running of the process and connected economical implications. All the above objects are achieved, according to this invention, by distilling the raw phosphorus pentasulphide under vacuum at a residual pressure of about 6 mmHg, said distillation being conducted according to a "thermal profile" which includes immediately before and immediately after the liquid-vapour-liquid double passage of state, two stationary stages in which said $P_4S_{10}$ is maintained in the liquid state, still under vacuum, at a temperature Ts that is substantially constant and identical for the two stages, very close to that of the boiling temperature of the same $P_4S_{10}$, in correspondence with the above mentioned residual pressure (365° C.-380° C.). In connection with the low level and with the particular profile of the process temperatures, as indicated above, said double passage from state to state is facilitated, maintained smooth and well under control, imparting to the process under examination an excellent operability and technical and economical efficiency, while yielding a very pure $P_4S_{10}$ associated to high material yields.

The above mentioned process will be even better understood by the expert on the strength of the description of a preferred embodiment and on the basis of the following examples with reference to the figures from 1 to 7, wherein the drawings are given in a schematical way.

Said description and examples are given for purely exemplifying and not limiting purposes.

FIG. 1 is a diagrammatic representation of the distillation apparatus in accordance with the present invention;

FIG. 2 is a diagrammatic representation of the thermal profile of the distillation process in accordance with the invention showing in particular that both prior to and after the evaporation step, $T_d$, phosphorous pentasulfide goes through a pre-evaporation step $T_{S1}$ and a post-evaporation step $T_{S2}$, both steps being characterized in that the phosphorous pentasulfide is maintained in the liquified state at a temperature Ts, preferably between 340° and 350° C.;

DESCRIPTION OF A PREFERRED EMBODIMENT

Figure 1:
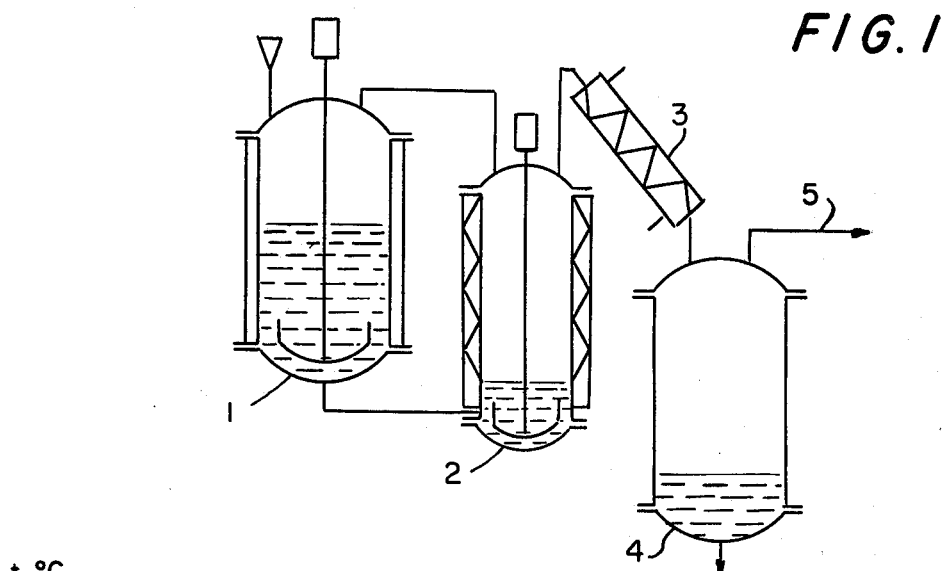

In the following description reference is made to FIG. 1 in which: with 1 and 4 are indicated the two apparatuses (both provided with a heating sleeve with a circulating heating fluid, while the apparatus marked 1 is also fitted with a stirrer) in which the $P_4S_{10}$ is maintained liquid at the same substantially constant temperature Ts, chosen from between the temperature range of 315°–350° C., but preferably from between 340° and 350° C., that is very close to the boiling temperature of the $P_4S_{10}$ in the distiller 2 (fitted with a stirrer and electrical heating), a temperature which is comprised between 365° and 380° C. when the residual pressure in the distiller itself is maintained around 6 mmHg.

With 3 is indicated a condenser, while 5 indicates the pipe for creating the void in the above cited process equipment, the pipe being connected with the vacuum pump (not indicated in the figure) for the collection and filtering of the uncondensed vapours.

The distillation process is achieved by first creating a vacuum in all the above cited apparatuses until attaining a residual pressure of about 6 mmHg, by then feeding into apparatus 1 raw liquid $P_4S_{10}$ and then bringing the same—and thus maintaining it at that level throught distillation—up to a constant temperature Ts comprised between 340° and 350° C., after which said $P_4S_{10}$ from vessel 1 is conveyed into distiller 2 where there takes place the evaporation of the same at a temperature comprised between 365° and 380° C. The $P_4S_{10}$ vapours are then brought to the liquid state through condenser 3, from which the liquid is gathered in vessel 4 where it is maintained at the same temperature Ts of the raw $P_4S_{10}$ contained in the vessel 1. During said distillation process—which may be conducted either batch-wise or in a continuous way—the residual pressure is substantially maintained at a constant value of 6 mmHg, while the stirrers of apparatuses 1 and 2 are kept in operation.

Figure 2:
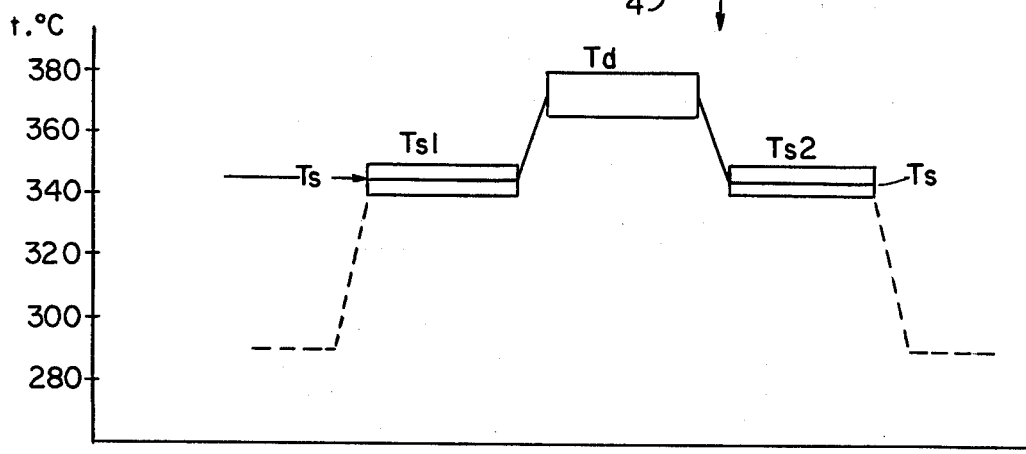
Figure 3:
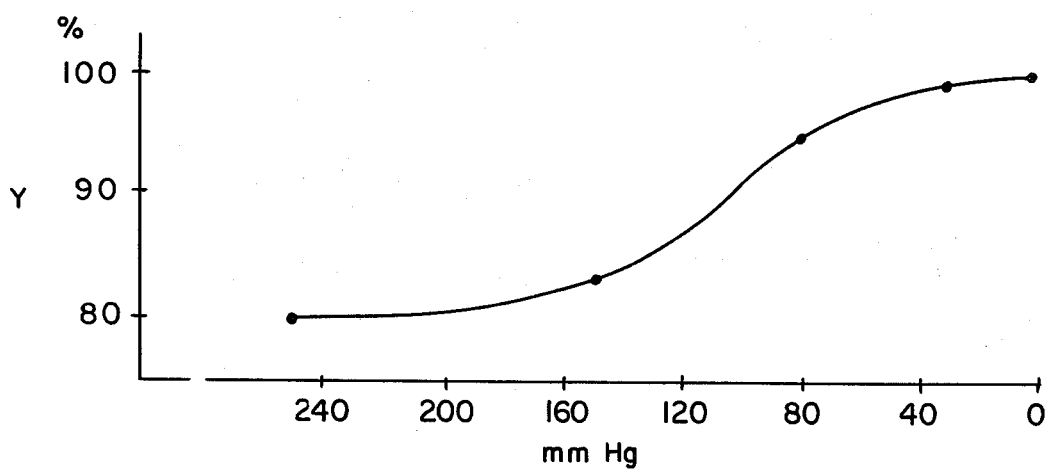
FIG. 3 is a graphical representation of the material yield, Y, plotted along the ordinate with respect to the pressure plotted along the abscissa.
Figure 4:
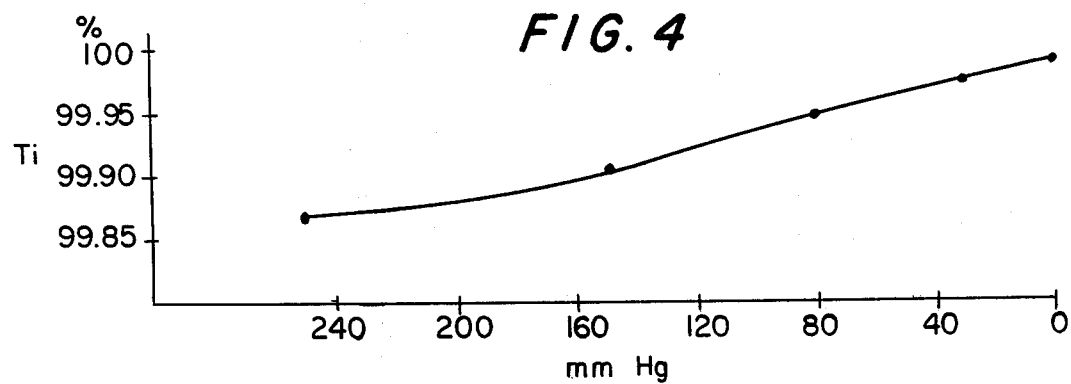
FIG. 4 is a graphical representation of the degree of purity, $T_i$, plotted along the ordinate with respect to the pressure plotted along the abscissa.
Figure 5:
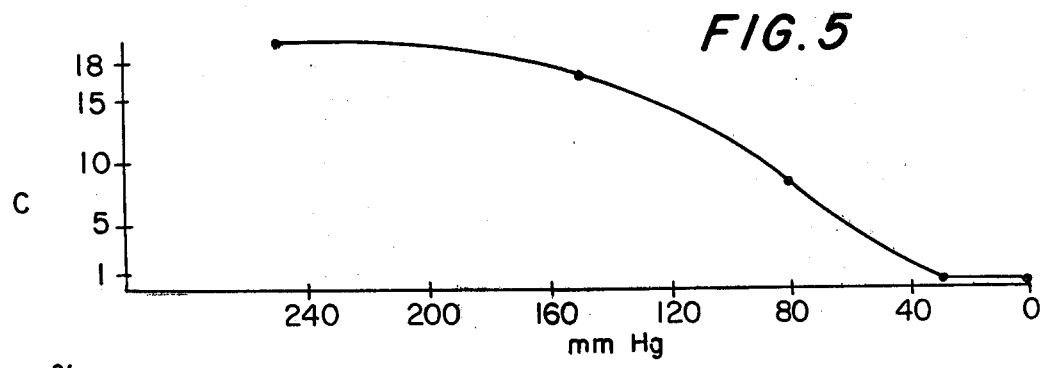
FIG. 5 is a graphical representation of the Gardiner color residue, C, plotted along the ordinate with respect to the pressure plotted along the abscissa.
Figure 6:
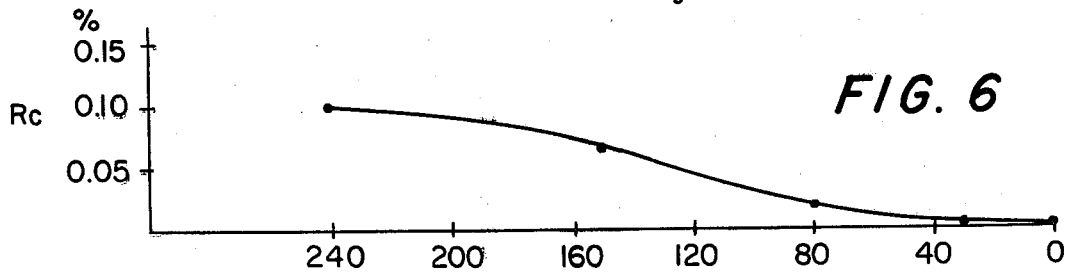
FIG. 6 is a graphical representation of the residue at calcination, $R_c$, at 700° C., plotted along the ordinate with respect to the pressure plotted along the abscissa.
Figure 7:
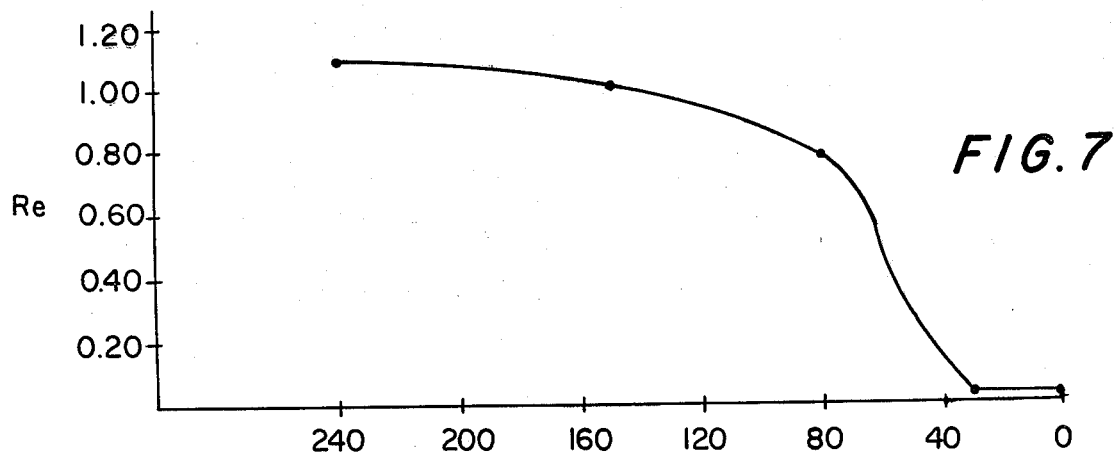
FIG. 7 is a graphical representation of the residue of ethenol, $R_e$, plotted along the ordinate with respect to the pressure plotted along the abscissa.

In FIG. 2 is shown, in a graphical-schematical representation, the above mentioned "thermal profile" adopted for the distillation; in said diagram the temperatures t are marked off on the ordinate, in particular recording the Ts temperature, while on the abscissa has been marked off the development in time (not quantified) of the various process stages, and more particularly:

first stationary stage, indicated with Ts 1, evaporation stage Td, and second stationary stage Ts 2.

In the following are described examples 1, 2 and 3 concerning purification processes for the purification of raw phosphorus pentasulphide by distillation under vacuum, according to the known teachings of the Prior Art, in order to compare the results with those of the subsequent examples Nos. 4 and 5 concerning the process object of this invention.

The yields and the quality achieved in said examples have been recorded on Table 1 where: with the word "Colour" is indicated the Gardner Colour Standard 1933 ASTM-D 154 (by "hig.18" meaning a dark yellow out-of-scale, while "les.1" indicates a colour value below minimum scale value, practically colourless); by the term "Calc.Res." is meant residue at calcining at 700° C., while with "Et.Res." is meant the residue insoluble in ethanol, both determined by means of the well known standard analytical methods.

EXAMPLE No. 1

Using a known technique, by synthesis of sulphur and yellow phosphorus there was prepared a batch of 50 Kg of raw $P_4S_{10}$, which at the chemical-physical analisis showed the following characteristics:

| | |
|---|---|
| Purity degree | 99.75% |
| Gardner Colour (Standard 1933/ASTM-D 154) | hig. 18 |
| | (out-of-scale) |
| Residue at calcination at 700° C. | 0.12% |
| Residue insoluble in ethanol | 1.25% |

Thereupon said $P_4S_{10}$ was subjected to purification by distillation under vacuum, operating in the following way:

from the above mentioned batch of raw $P_4S_{10}$ there were drawn 5 Kg of solid product which were placed into an iron distiller, of a known type, fitted with a condenser and corresponding collecting vessel through which the said distiller is connected to a vacuum pump. Thereupon there is made a vacuum until attaining a residual pressure of about 250 mmHg, after which one proceeds with the distillation, while still under said vacuum, at the end of the operation gathering 4,00 Kg of purified $P_4S_{10}$ having the characteristics indicated on Table 1.

EXAMPLE No. 2

The same purification operation of example 1 was repeated, except that the residual pressure amounted to 150 mmHg.

Thereby were obtained 4.17 Kg of purified $P_4S_{10}$ having the characteristics indicated on Table 1.

EXAMPLE No. 3

The same purification operation of Example 1 was repeated again, but with the difference that the residual pressure amounted to 80 mmHg. Thereby were obtained 4.75 Kg of purified $P_4S_{10}$ showing the characteristics recorded on Tab. 1.

EXAMPLE No. 4

Following the operational procedures according to this invention, as already described in the preferred embodiment, and using the equipment illustrated in FIG. 1 to which reference has been made herein above, there was carried out a purification operation of 5 Kg of raw $P_4S_{10}$, drawn from the batch mentioned in example 1, and operating in the following way:

(a) in apparatuses 1, 2, 3 and 4 (FIG. 1) a vacuum was produced leaving a residual pressure of 6 mm Hg;

(b) into apparatus 1 there were then introduced 5 Kg of said raw phosphorus in the molten state, which was then heated under stirring, until reaching a temperature of about 345° C., which latter was then maintained constant substantially through the successive operations indicated hereunder;

(c) 0,5 Kg of said $P_4S_{10}$ were passed from apparatus 1 into apparatus 2 where the same $P_4S_{10}$, kept under stirring, was further heated to from 370° to 375° C., at which temperature there occurred the evaporation of said $P_4S_{10}$, which successively passed again to the liquid state passing through condenser 3, to then be gathered, still in the liquid state, in vessel 4 where it is maintained at a substantially constant temperature that will be equal to that of the $P_4S_{10}$ contained in apparatus 1; this latter $P_4S_{10}$ passes into said apparatus 2, up to its exhaustion, at the same rate (Kg/hour) at which the $P_4S_{10}$ contained in apparatus 2 evaporates and passes, condensed, into vessel 4.

During all the above illustrated operations, the residual pressure was substantially maintained constant at the value of about 6 mmHg, in all the above indicated apparatuses.

At the end of the above described purification operation there were obtained 4.98 Kg of purified $P_4S_{10}$ having the characteristics reported on Table 1.

EXAMPLE No. 5

Again there was repeated in the same way the purification operation described in example 4, with the difference, however, that the residual pressure was 30 mmHg. Thereby were obtained 4.95 Kg of purified $P_4S_{10}$ showing the characteristics reported on Table 1.

On the diagrams of figures from 3 to 7 have been recorded the data on Tab. 1, in order to better evidence the "peculiar" and surprisingly good results that are obtained when purifying the $P_4S_{10}$ according to the process object of the present invention.

In said diagrams or graphs, on the abscissae is indicated the residual pressure in mmHg, while on the ordinates have been indicated with:

Y: the yield in material (% of purified $P_4S_{10}$);
Ti: purity degree, in %
C: Gardner colour (as in Table 1)
Rc: residue at calcination at 700° C. (in %)
Re: residue at ethanol (in %)

Although achieving very good results when operating substantially according to the present invention with the only variant of keeping the residual pressure slightly higher, for instance around 30 mmHg, it is preferable to operate at about 6 mmHg in order to ensure more reliable and reproducible results in the industrial practice of the process object of this invention, for the realization of which, moreover, there may also be adopted technically equivalent solutions for achieving the objects of the invention itself.

More particularly, this process may be realized either operating in a continuous or a semi-continuous way, besides batch-wise, as herein above described and exemplified.

TABLE 1

| Yields and Quality Characteristics | Results of examples no°: | | | | |
|---|---|---|---|---|---|
| | 1 (250 mm Hg) | 2 (150 mm Hg) | 3 (80 mm Hg) | 4 (30 mm Hg) | 5 (6 mm Hg) |
| Yields, in % | 80% | 84% | 95% | 99,0% | 99,7% |
| Purity degree, in % | 99,87% | 99,91% | 99,95% | 99,98% | 99,99% |
| Cal. Res., % | 0,10% | 0,06% | 0,02% | 0,00% | 0,00% |
| Res. Et., % | 1,10% | 1,00% | 0,80% | 0,00% | 0,00% |
| Colour | hig. 18 | 17 | 9 | les. 1 | les. 1 |

I claim:

1. Process for the purification of phosphorous pentasulfide by means of distillation in which the phosphorous pentasulfide is liquified by heating at a temperature below its boiling point temperature, the liquified phosphorous pentasulfide is evaporated under reduced pressure at a temperature between 365° and 380° C., and the vapors of phosphorous pentasulfide are condensed by cooling, characterized in that the liquification, evaporation and condensation of the phosphorous pentasulfide are carried out at a residual pressure of about 6 mmHg, and the phosphorous pentasulfide both prior to and after the evaporation is heated and cooled respectively at a temperature between 315° and 350° C.

2. Phosphorous pentasulfide purified according to the process as claimed in claim 1, characterized in that it has a purity degree higher than 99.98%.

3. The process in accordance with claim 1, wherein the phosphorous pentasulfide both prior to and after the evaporation is heated and cooled respectively to a temperature between 340° C. and 350° C.

* * * * *